United States Patent [19]
Ekman

[11] Patent Number: 5,467,964
[45] Date of Patent: Nov. 21, 1995

[54] QUICK COUPLING COMPONENT WITH PRESSURE REDUCTION MEMBER

[75] Inventor: Thure Ekman, Skovde, Sweden

[73] Assignee: Dart Engineering AG, Zug, Switzerland

[21] Appl. No.: 247,999

[22] Filed: May 24, 1994

[30] Foreign Application Priority Data

May 28, 1993 [SE] Sweden .................................. 9301829

[51] Int. Cl.$^6$ ...................................................... F16L 37/28
[52] U.S. Cl. .................................. 251/149.6; 137/614.03; 137/630.15; 251/334; 251/368
[58] Field of Search ............................ 137/614.03, 630.15, 137/539, 539.5; 251/149.6, 334, 368

[56] References Cited

U.S. PATENT DOCUMENTS

| | | | |
|---|---|---|---|
| 4,564,042 | 1/1986 | Ekman | 137/614.03 X |
| 4,709,725 | 12/1987 | Morrison . | |
| 4,722,359 | 2/1988 | Hani | 137/539.5 X |
| 4,896,697 | 1/1990 | Stromdahl . | |
| 5,107,890 | 4/1992 | Gute | 137/539 |
| 5,159,955 | 11/1992 | Ekman | 137/614.03 |
| 5,215,122 | 6/1993 | Rogers et al. . | |

FOREIGN PATENT DOCUMENTS

| | | | |
|---|---|---|---|
| 1356243 | 6/1974 | United Kingdom . | |
| 1471211 | 4/1977 | United Kingdom . | |
| 2096279 | 10/1982 | United Kingdom | 251/334 |
| WO88/04382 | 6/1988 | WIPO . | |

OTHER PUBLICATIONS

Patent Abstracts of Japan, vol. 14, No. 404 (M–1018) Jun. 14, 1990, 2–154875, Electric Power Dev Co Ltd.

*Primary Examiner*—Robert G. Nilson
*Attorney, Agent, or Firm*—Pollock, Vande Sande & Priddy

[57] ABSTRACT

A quick coupling component including at least one valve member. A pressure reduction channel is provided in at least one valve member. A pressure reduction member is arranged in the pressure reduction channel. The pressure reduction member includes a shut-off element arranged in the pressure reduction channel. A seat includes a seat surface, wherein in a closed position a first portion of the shut-off element surface bears against the seat surface. The seat surface substantially corresponds to the shut-off element first surface portion. The seat surface includes a degree of fineness substantially corresponding to a degree of fineness of the shut-off element. At least one of the seat and the shut-off element is formed of a material having a hardness substantially exceeded by a hardness of another of the seat and the shut-off element. At least one of the seat and shut-off element is formed of a material having an elasticity contributing to a function sealing of the shut-off element against the seat in the closed position. A force transmission member maintains the shut-off element in a closed position. The force transmission member includes a surface designed to contact the shut-off element along a second portion of the surface of the shut-off element. An activation member separates the shut-off element from the seat surface into the open position counter to an action of the force transmission member.

26 Claims, 7 Drawing Sheets

QUICK COUPLING COMPONENT WITH PRESSURE REDUCTION MEMBER

FIELD OF THE INVENTION

The present invention relates to a quick coupling component including one or more valve members for opening and closing a main flow, and a pressure reduction member arranged of a pressure reduction channel in at least one valve member. The pressure reduction member includes a first shut-off element arranged in the pressure reduction channel and is provided with a spherical surface. The shut-off element, in a closed position for the pressure reduction channel the shut-off element, bears against a seat. In an open position for the channel, is lifted from the seat by an activation member counter to the action of a spring function.

BACKGROUND OF THE INVENTION

A pressure reduction function in quick coupling is already known, and in this respect reference can be made to the U.S. Pat. No. 4,564,042 and 5,159,955. In such a coupling the pressure reduction function can be included in one or both of the coupling components. The pressure reduction function includes a shut-off element in the form of a ball that is acted upon, counter to the action of a spring, in order to lift it from its seat. Media can then flow past the shut-off element. The passing flow causes the pressure, acting counter to the coupling force of the coupling components, to be released. In this way coupling of the coupling components is considerably facilitated. Depending on how the pressure conditions appear before coupling, in the coupling arrangement in question the coupling component concerned or both coupling components is/are provided with a pressure reduction function.

SUMMARY OF THE INVENTION

There are great problems involved in achieving an appropriate pressure elimination function. The shut-off element must be completely sealed against the seat surface in question. Otherwise, media can leak past in the closure position of the pressure elimination function media can also leak out, for example, to the outer surface of the coupling component concerned. This surface is thus soiled with media, for example hydraulic oil. Such a soiling cannot normally be accepted, accordingly it is currently demanded of quick couplings that they should be able to function in or create a leakproof environment. In this connection, it should be mentioned that even the leaking of what are, relatively speaking very small quantities of media presents problems. The aim of the invention, among other things is to solve, these problems.

The said above described problems are aggravated by the fact that the quick coupling should be able to be coupled against even relatively high pressures, for example pressures of 300 bar or more, which sets even higher demands on the sealing function in the pressure reduction function. The invention solves this problem too.

Quick couplings are generally manufactured in relatively long series. In addition, different components can be manufactured by different manufacturers. Also an assembly can be carried out by yet another manufacturer, etc. Furthermore, the different components manufactured in this way must, on the one hand, exhibit great accuracy of manufacture and, on the other hand be able to function together in the finally assembled state of the couplings. This necessitates the independence of pressure elimination function in relation to the manufacturing circumstances. The invention solves this problem too.

It must be possible for the quick coupling to function for relatively long periods of time without the need for frequent servicing and replacement of vital components in the coupling. Also it should be possible for a quick coupling to be subjected to a very large number, for example 100,000, of couplings and decouplings. This also places demands on the pressure elimination function, which should come into operation in all coupling instances. The present invention solves this problem too.

The quick coupling should be able to operate at different pressures and pressure conditions with increasing pressures. In addition, it should be possible for a quick coupling to be used in any chosen situation within a wide appropriate coupling range. The pressure reduction function means must be able to function for all the connection possibilities which are conceivable for the coupling in question. The invention solves this problem.

Quick couplings are often part of a product range which is subject to pricing pressures, with the result that it must be possible to use efficient, automated and/or cost-effective manufacturing methods. This invention solves this problem too.

The feature which can principally be regarded as characterizing a quick coupling component according to the invention is that the seat is designed with a seat surface that corresponds to parts of the spherical surface of the shut-off element. The seat surface has a degree of fineness that to a great extent corresponds to the degree of fineness of a shut-off element. To a great extent here means that the degree of fineness of the seat surface should amount to 50–100%, preferably 75% or more, of the degree of fineness of a shut-off element that is used in this connection and has a hardness that substantially exceeds the hardness of the seat material, for example exceeds the hardness of the seat material by 1–4 times. A further characteristic of the invention is that an elasticity inherent to the material of the seat and/or the element contributes to the sealing function of the spherical element against the seat in the said closed position.

In embodiments of the inventive concept the seat surface is established by means of upsetting or persistent deformation of the seat material. The elasticity in the material layer during the persistent deformation can, in this case form part of the said contribution to the sealing function of the shut-off element against the seat. In a preferred embodiment, the deformation is obtained with the aid of the shut-off element in question or a shut-off element that is used for the deformation in question. The deformation is obtained in this case by means of an actuating force or a knocking force applied to the shut-off element. The respective force is, in this case, of such an order of magnitude that the persistent deformation occurs in the seat material.

In some embodiments, especially in embodiments where the seat material is comparatively soft a bevelled surface is arranged on the seat. The bevelled surface is subjected to the actuating or knocking function. The bevelled surface of the seat can be used on softer seat material, for example brass. By means of the bevel, it is possible to eliminate in advance the flash edges and burrs in the seat material before the knocking function or the like is applied.

In a preferred embodiment, a force transmission member is arranged between the shut-off element/ball and a member effecting the spring function, for example a spring. The transmission member preferably comprises a plane surface that can cooperate with the sphere of the shut-off element and that is assigned a relatively small impression or depression in the shut-off element. The impression or depression is designed in such a way that its chord diameter assumes values of between 5–25% of the diameter of the shut-off element or ball. The impression or depression contributes to giving the shut-off element clear-cut opening and closure movements in relation to the seat and to giving considerable repetitiveness in the pressure reduction function.

In the exemplary embodiment the shut-off element has the shape of a ball with a hardness of 40–65, preferably approximately 55 HRC. The seat material can be made of free-cutting steel, that is of a steel that is here referred to as soft steel. The hardness of such steel can lie within the range of 150–170 HB. In accordance with the above, the seat can also be made of brass and can in this case have a hardness of 100–200 Hv. Stainless steel can also be used as the seat material, in which case the hardness is of the order of magnitude of approximately 100 HB.

In a preferred embodiment the coupling component in question is made of hardened material or with a hardenable outer layer. The hardened layer is removed adjoining the seat, for example by drilling, so that a seat of non-hardened material is obtained. In one embodiment the pressure reduction channel (part of it) can have a bore diameter of 2–3 mm, preferably of approximately 2.3 mm. The bore is approximately 60–85%, preferably approximately 75%, of the diameter of the ball used. In the said seat upsetting an impact energy is used of the order of magnitude of 0.3–1.0 newton/sec$^2$. The seat surface preferably has a degree of fineness of $5$–$20 \times 10^{-9}$ mm. The elasticity of the seat material can be chosen such that it provides elastic resilience or stretching of approximately $10^{-7}$ mm. In one embodiment, use is made of a shut-off element in the form of a plastic ball made of polyoxymethane.

In one embodiment the ball is furthermore arranged in a holder that is guided against an inner wall in the pressure reduction channel. The holder has spring members that bear along the spherical surface of the ball. The members extend somewhat past the halfway height, (or radius) of the ball so that the ball is held by the holder by means of the inherent resilience of the holder material. The ball cooperates with the seat via the part of its spherical surface that is not enclosed by the members. The holder members are guided against the wall of the pressure reduction channel, and the media can flow between the holder members when the pressure reduction function is activated. The holder has bearing members, for example pin, recess, for the spring members.

In one embodiment, the ball is arranged in such a way that its lifting height is less than the height of that part of the ball engaged in the seat when the ball assumes the closure position. The ball is in this way prevented from executing a pronounced lateral displacement movement in which the ball, in its lifted state, can leave the seat. In one embodiment the bottom of the seat can be inclined in relation to the inner wall of the pressure reduction channel, for example by 75°–95°, preferably approximately 80° or 90°.

Other embodiments of the construction of the pressure reduction channel and the pressure reduction member emerge from the patent claims which follow.

In a method for producing the abovementioned quick coupling component with a pressure reduction function, the seat is given a surface. The surface corresponds, to the spherical surface of the shut-off element. The surface is provided with the aid of the first shut-off element or a second shut-off element, by means of the shut-off element in question being applied against the seat and being assigned a controlled hocking or actuating movement of an order of magnitude which is such that a substantial portion, for example 50–100%, of the degree of fineness of the shut-off element is transferred to the seat surface. The material of the seat and/or shut-off element is chosen with a degree of elasticity which is such that the material participates in the sealing function of the element in the seat.

In one embodiment of the novel method, an upsetting of the seat material is obtained by means of the knocking or actuating force. The elasticity in the material layer during the upsetting of the seat is made to contribute to the sealing function of the element in the seat. In one embodiment, the quick coupling component is made of hardened material. The hardened layer is removed adjoining the seat in order to obtain a non-hardened section adjoining the seat.

What has been proposed above ensures a reliable sealing function in the pressure reduction member. The seal paves the way for considerable leakproofness and use of the couplings in leakproof environments. The method of manufacture is relatively simple, and standardized products can be used as regards the balls, springs, material, among other things. Couplings with wide areas of use can be produced. The seat surface can be given the necessary degree of fineness in a simple manner. The same coupling can be used in different connection situations and can be assigned different areas of use. The couplings do not, therefore, have to be specially designed for each particular connection situation. The repetitiveness and the service life are outstanding using the new principles.

BRIEF OF THE FIGURES

A presently proposed embodiment of a quick coupling component and a method for the latter will be described hereinbelow with reference to the attached drawings, in which FIG. 1b shows, in an end view, parts of FIG. 1a, FIG. 2 shows, in a vertical view, and on an enlarged scale, the shut-off element and seat surface in association with a pressure sure reduction channel.

DETAILED DESCRIPTION OF PREFERRED EMBODIMENTS

The invention can be used on and for different types of quick couplings that are to be provided with a pressure reduction function. In in this respect, reference may be made in general to quick couplings of the type which appear in the above-cited U.S. patent.

Figure 1:
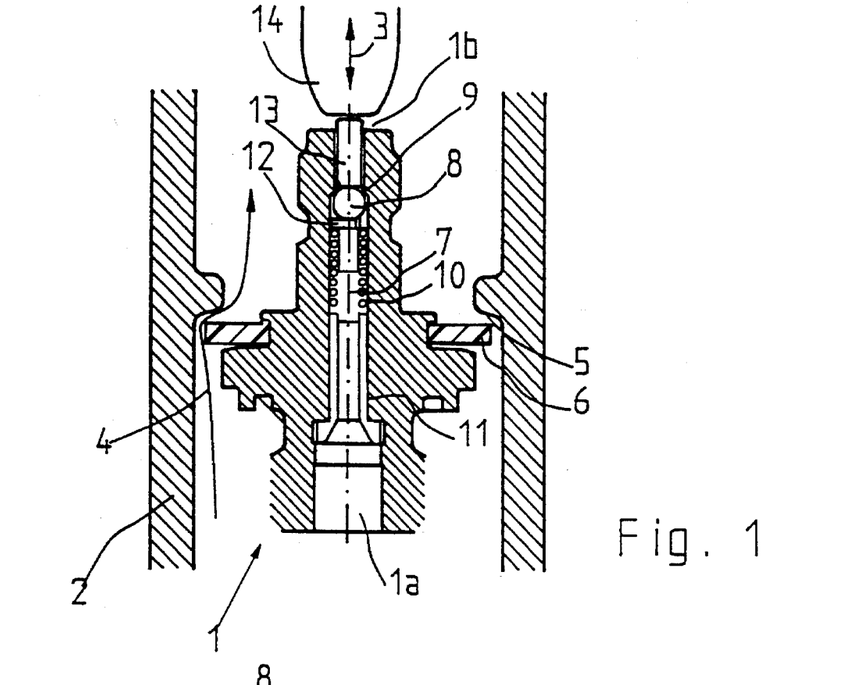
FIG. 1 shows, in longitudinal section, parts of a quick coupling component which comprises a valve member in which a pressure reduction member is arranged.

FIG. 1 shows a design of a valve body 1 arranged in a quick coupling component 2 (partially shown). By means of its longitudinal displacement movements 3, the valve body guides a main flow 4 through the coupling 2. A seat function 5 is opened and closed by the valve body 1. The valve body can be provided in this case with sealing members 6 for the main flow 4 that is to pass the valve body 1 and the seat 5 in a coupling stage or in the case of a fully established coupling between male add female coupling parts in a quick coupling.

The valve body 1 has a pressure reduction function that in turn, comprises a pressure reduction channel 7 which leads from the one side 1a of the body 1 to the other side 1b of the body. The pressure reduction function also includes a shut-off element in the form of a ball 8. The ball is pressed against a seat 9 with the aid of a spring force obtained from a spring 10, which can consist of a cylindrical spring. In the embodiment shown, a bushing 11 is arranged to form a support member for the spring 10. The spring acts on the ball 8 via a force transmission member 12, which, in the case shown, has the shape of a pin with a head part and a peg-shaped part. The ball 8 can be acted upon by means of an activation member 13 in conjunction with the mechanical activation of the valve body 1 by means of a second longitudinally displaceable part 14 in the coupling component 2. In other embodiments of the coupling, the activation member can be acted upon by a male or female part, directly via this male or female part or via some other moveable valve body part.

Figure 1A:
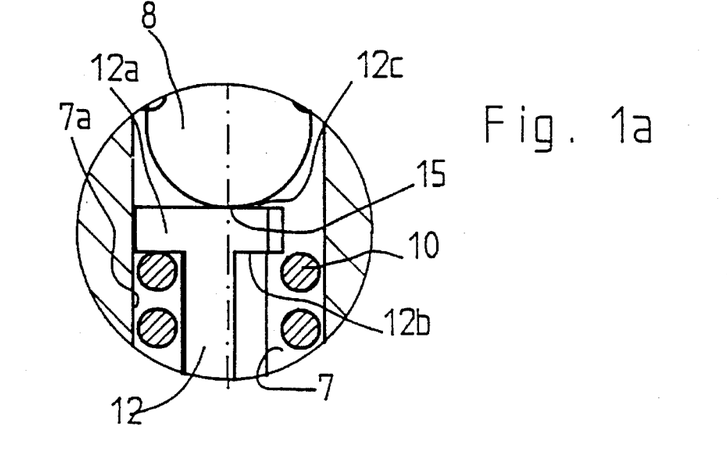
FIG. 1a shows, in longitudinal section, and on an enlarged scale compared to FIG. 1, parts of the valve member in FIG. 1.
Figure 1B:
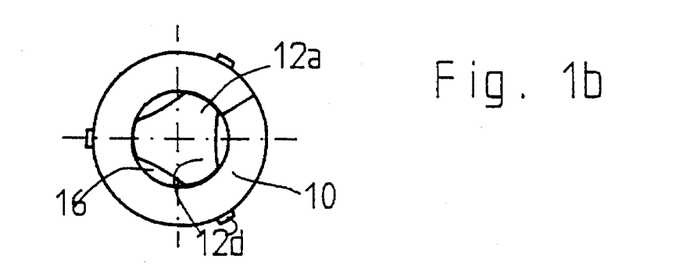

Upon its activation by the part 14, the part 13 executes a longitudinal displacement movement and lifts the ball 8 from the seat 9 counter to the action of the spring 10. According to FIG.1a, the pin 12 is designed with a peg-shaped part, extending inside the cylindrical spring. The spring 10 bears against the underside 12b of a head 12a of the pin 12. Furthermore, the ball 8 bears against the top face 12c of the pin 12. The head 12a, on its part supporting a face 12c, includes an impression 15 that is described in greater detail hereinbelow. The head 12a of the pin 12 is designed with a prismatic configuration according to FIG. 1b. The configuration has three wing-shaped parts 12d by means of which the pin cooperates with the inner wall 7a of the recess 7. When the ball is lifted, the flow of media can pass through the spaces 16 between the said parts 12d.

Figure 2:
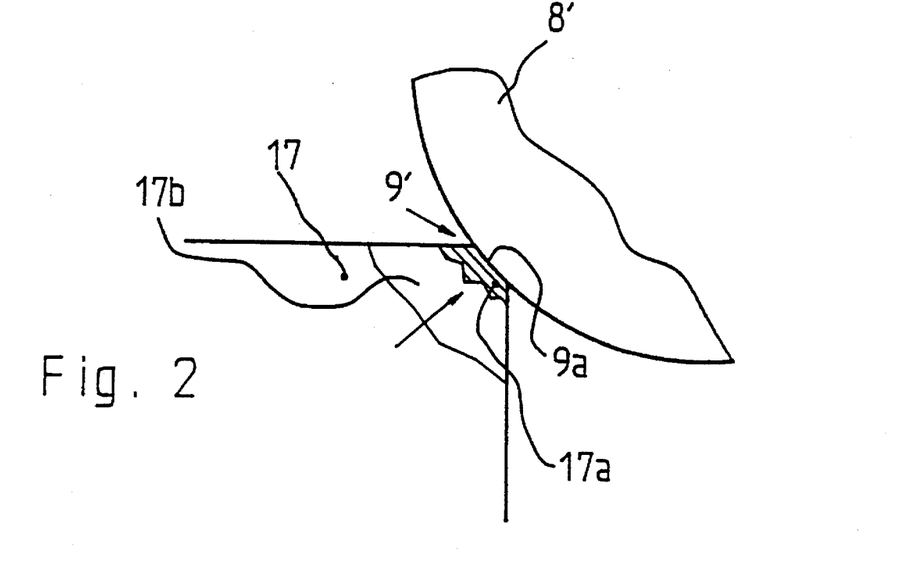
Figure 2A:
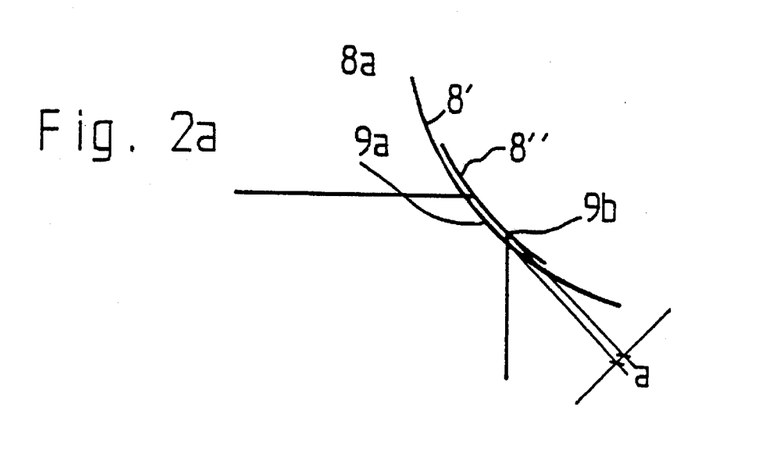
FIG. 2a shows, in vertical section, different functional positions of the shut-off element and the seat according to FIG. 2.

FIG. 2 shows parts of the ball 8' and the seat 9' greatly enlarged. In FIG. 2a the surface 9a of the seat is shown to have a concave form that corresponds to the convex outer surface 8a of the ball 8'. The seat surface has come about by means of the material in the seat part 17, at the position for the seat surface, having been assigned a persistent deformation. The seat material is required to be relatively soft. The softness is here relative to the hardness of the ball. The ball is preferably three times or more harder than the seat material. The ball is of the type that can be purchased on the general market and has a hardness of, for example, approximately 55 HRC (Rockwell hardness, measurement form C). The seat can be made of free-cutting steel with a hardness of approximately 160 HB (Swedish standard SS 914). Alternatively, the seat material can be made of brass with a hardness of approximately 150 Hv (Swedish standard SS 5170) or stainless steel of approximately 100 HB (Swedish standard SS 2343).

By means of the choice of material, the seat material in the layer 17b is assumed to possess a certain slight elasticity during the persistent deformation 17a. The elasticity is actively utilized in the sealing function between the ball and the seat surface 9a. The elasticity results in a certain resilient movement which has been indicated by a in FIG. 2a. In FIG. 2a, the outer layer of the ball has been indicated by 8', 8" and the outer layers of the seat by 9a, 9b. The length of the movement a lies in the range of $10^{-7}$ mm. The surface 9a has a degree of fineness which lies in the range of $5-20 \times 10^{-9}$ mm. The degree of fineness can also be measured in relation to the abovementioned ball, the surface fineness of which should be set in relation to the seat surface 9a. Thus, the last-mentioned surface has a fineness that is 50–100%, preferably 75–100%, of the degree of surface fineness of the ball.

Figure 3:
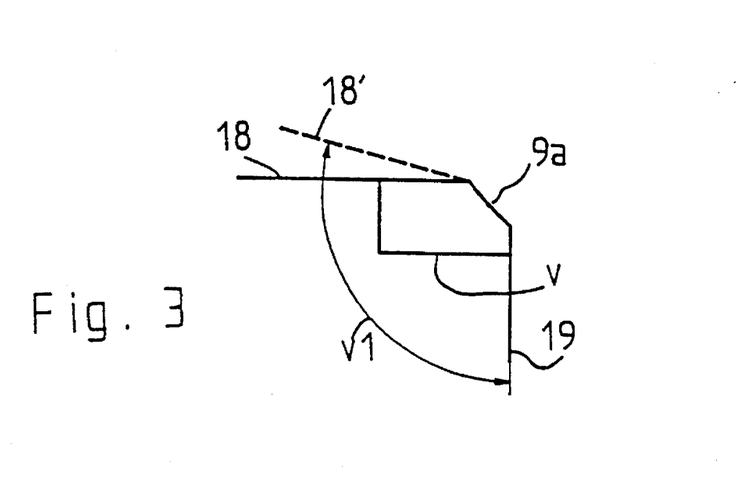
FIG. 3 shows, in a vertical view, the seat surface and different extensions of the bottom surface in a recess in the seat in the pressure reduction channel.

According to FIG. 3 the seat bottom 18 can be set at different angles with respect to the inner wall 7a of the pressure reduction channel. In the case of relatively hard material (free-cutting steel) in the seat, the angle can be chosen as a right-angle (90°), while in the case of relatively soft material (brass) the angle V1 can be chosen between 80°–90°.

Figure 4:
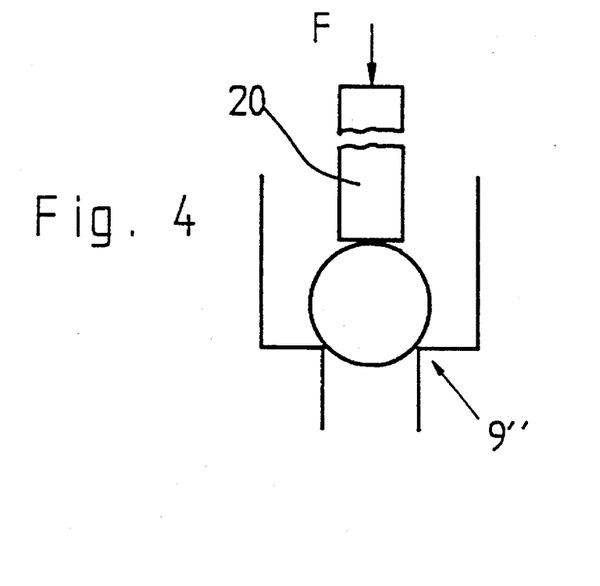
FIG. 4 shows, in a vertical view, the application of a deformation force on the shut-off element in the form of a ball for the purpose of achieving a persistent deformation of the seat material.
Figure 5:
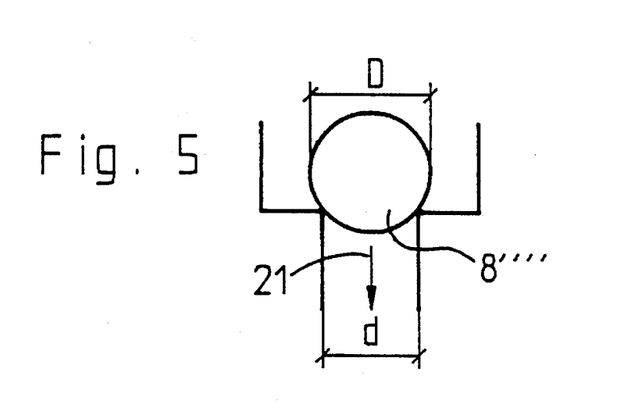
FIG. 5 shows, in a vertical view, the application of a ball, different from the ball in FIG. 4, to an already deformed seat material, on which the seat surface is arranged.

FIGS. 4 and 5 show how the surface fineness of the ball 8''' is transferred in a simple manner, in accordance with the above, to the seat 9''. An actuating force or hocking force F is applied to the ball 8''' via a member 20. The force F is controlled and generates the persistent deformation 17a, see FIG. 2, and the fine surface 9a. In the case of a channel diameter d of 2.3 mm and a ball diameter D, of which the channel diameter d is 50–85%, preferably approximately 75%, an impact energy is used, for generating the force F, of 0.3–1.0, preferably approximately 0.6 Newton/sec². The force is also chosen as a function of the seat material (softness/hardness of the latter). Upon use in the pressure reduction function, the ball or shut-off element is subjected, in the closure function, and in certain cases, to approximately 125 Newton if the pressure in the enclosed medium amounts to 300 bar. The elasticity should, in this case, be utilized in the sealing function of the ball or shut-off element.

Figure 5A:
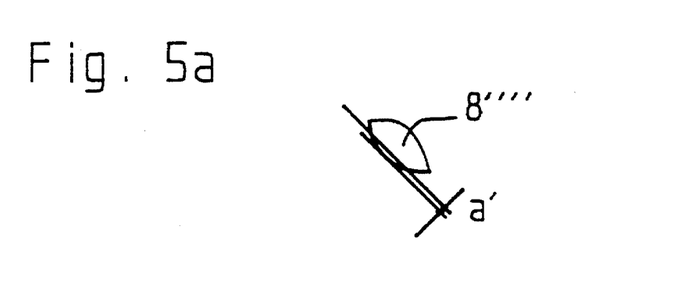
FIG. 5a shows, in a vertical view, the elasticity function of the ball according to FIG. 5.

If a plastic ball is used, for example the ball 8'''', the hocking of the seat should be carried out with another ball, for example the ball 8''', and, after the seat surface 9a has been formed in this way, the ball 8''' is removed and the ball 8'''' is applied, which ball 8'''' is shown, in the figure, on its way to its seat position in the direction of the arrow 21. If the plastic ball is used, the elasticity of the latter can be utilized alternatively or as a complement to the elasticity in the seat. In FIG. 5a the spring length of the ball material is indicated by a'.

Figure 6:
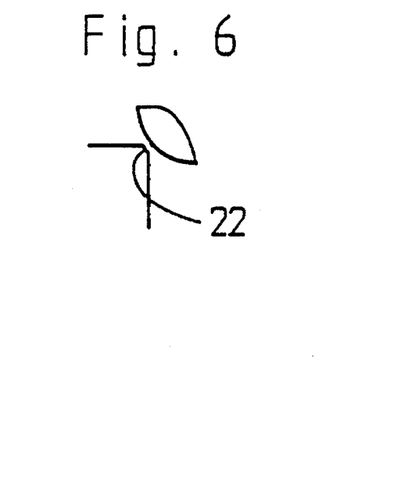
FIG. 6 shows, in a vertical view, a bevelled seat surface in the seat material.
Figure 6A:
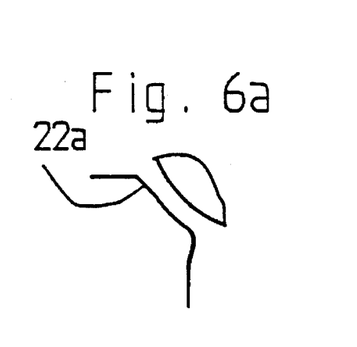
FIG. 6a shows, in a vertical view, the effect of the deformation of the seat material in conjunction with the bevelled surface according to FIG. 6.

In the case of softer material for the seat, for example stainless material for the seat, and in the case of tough material, such as stainless steel, the seat material is given a bevelled surface 22 according to FIGS. 6, 6a before the hocking procedure. In this way, burrs and flash edges can be removed before the seat surface is established, after which the part 22a of the bevelled surface can remain.

Figure 7:
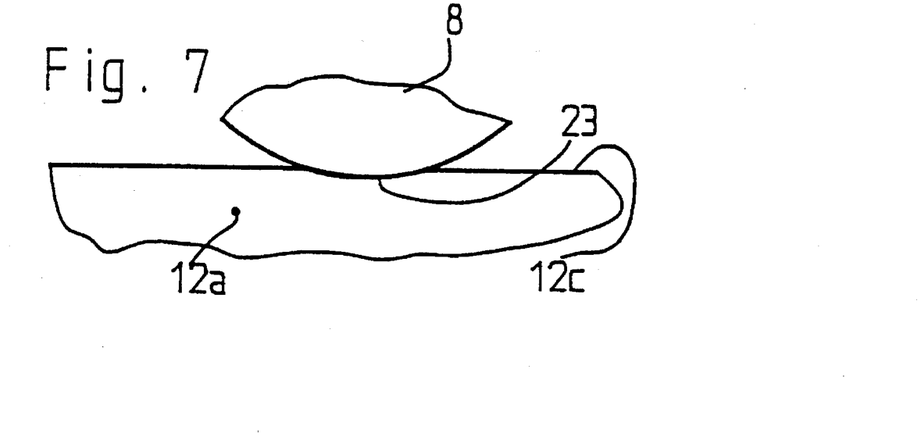
FIG. 7 shows, in a vertical view, and on an enlarged scale, a depression or hollow in a force transmitting member and a spring member.
Figure 8:
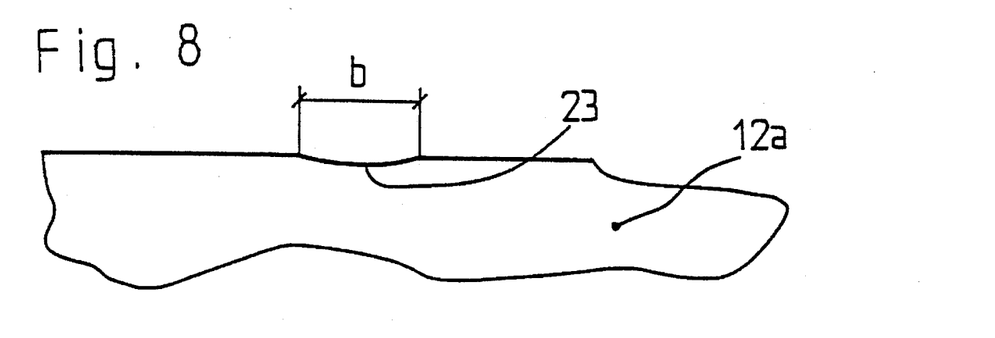
FIGS. 8–8a show different views of the hollow according to FIG. 7, FIGS. 9a–9d show, in vertical views, different embodiments of the pressure reduction channel and the pressure reduction member arranged therein.
Figure 8A:
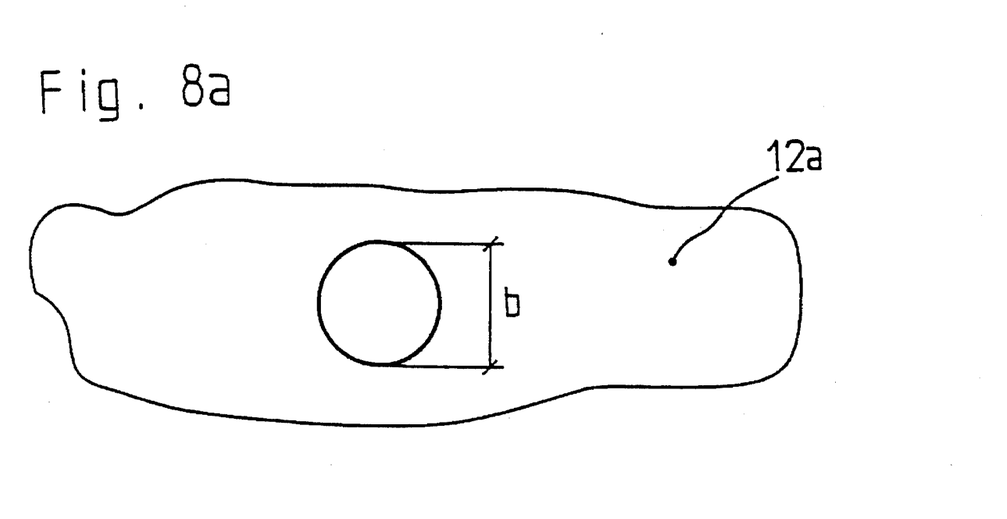

FIG. 7 shows the ball 8 and the pin head 12a in an enlarged view. A spherical cup-shaped hollow 23 is arranged in the plane surface 12c of the pin head. The chord or the diameter of the hollow 23 is 10–25% of the diameter D of the chord (see FIG. 5). The hollow is of great importance as regards giving the ball clean opening and closing movements and as regards the repeated use.

FIGS. 9a–9d show different arrangements of the pressure reduction member in the pressure reduction channel. According to FIG. 9a, the pressure reduction channel is arranged with three different recesses 24, 25 and 26. The transition between the spaces 24 and 25 forms the seat 27. The ball 28, the force transmission member 29 and the spring 30 are arranged in the second space 25. At the transition between the space 25 and 26 there is a retaining or support ring 31 for the spring. The ring has a bearing recess 32 for a part of the pin 29 extending inside the spring. The last-mentioned part of the pin can be of prismatic cross-section in accordance with the above in order to permit the passage of media in each direction when the ball 28 is lifted by an activation member 33 arranged in the space 24. The space 24 has the smallest cross-sectional area; the space 25 has the second largest cross-sectional area; and the space 26 has the largest cross-sectional area.

Figure 9A:
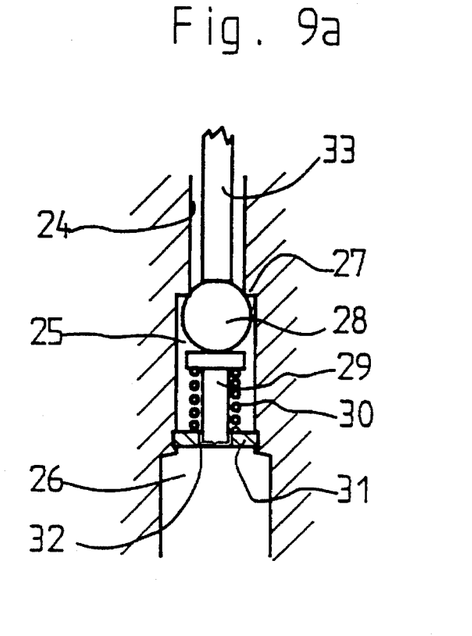
Figure 9B:
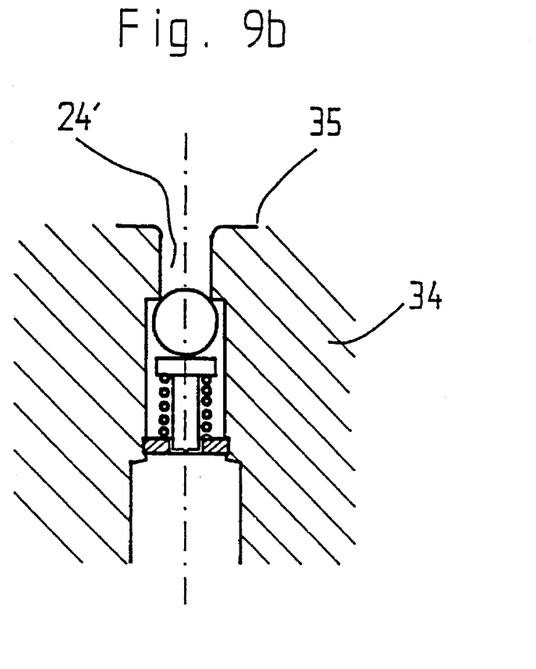

FIG. 9b shows a pressure reduction arrangement corresponding to FIG. 9a. In this case the pressure reduction member is arranged in a part, for example, a male part 34, with end surface 35. The activation member is not shown in this case, but can enter the recess 24'.

Figures 9C, 9D:
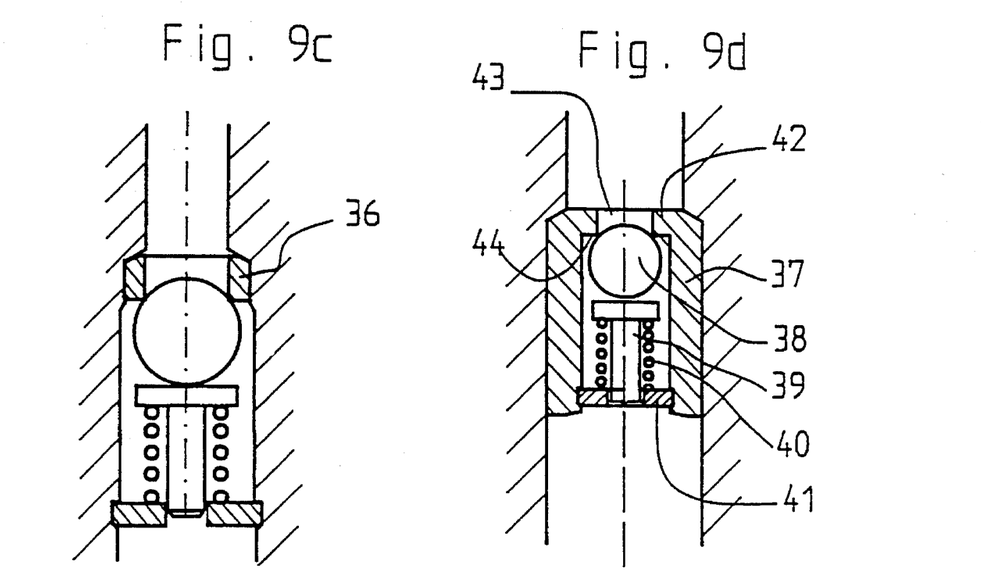

FIG. 9c shows an embodiment with the seat part in the form of a bushing-shaped/ring-shaped member that can be made with the desired softness/hardness. The force-transmitting member is controlled in a corresponding manner.

In the embodiment according to FIG. 9d, a sleeve-shaped member 37 is used for bearing the ball 38, the force transmission member 39, the spring 40 and the support member 41 for the spring, as well as a bearing hole for the force transmission member. The sleeve-shaped member is arranged with an end surface 42 and a recess 43 arranged in this, as well as a seat 44 for the ball.

Figure 10:
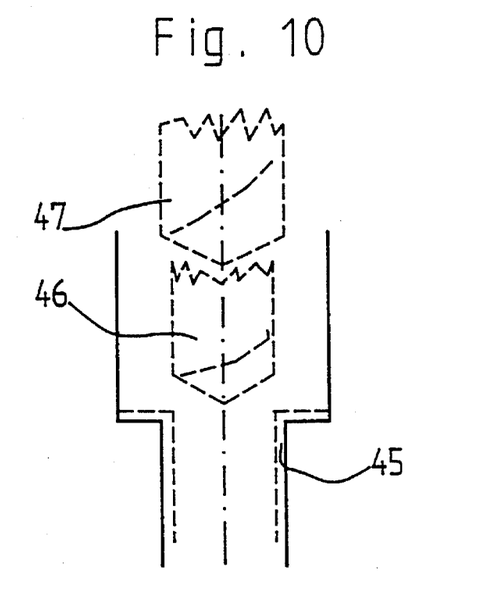
FIG. 10 shows, in a vertical view, the removal of a hardened layer of the seat material.

FIG. 10 shows how a hardened/carbonized layer 45 can be removed using drills 46 and 47 of different diameters. By removing the layer 45, a softer seat material part is obtained in which the deformation can be carried out, in accordance with the above, for producing the seat surface.

Figure 11A:
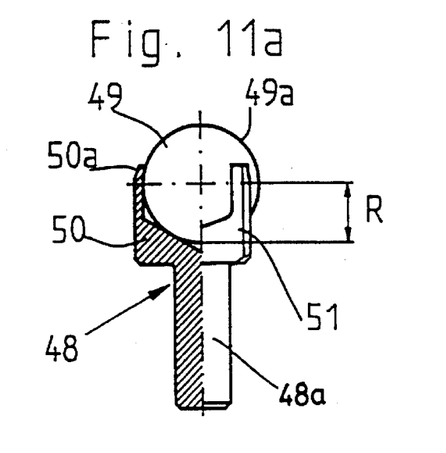
FIGS. 11a–11b show, in a vertical view and horizontal view, respectively, a holder arrangement for a shut-off element.
Figure 11B:
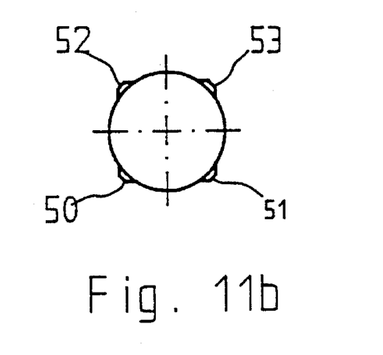

FIGS. 11a and 11b show a holder 48 for a ball 49. The holder is designed with a number of arms, for example four arms 50, 51, 52 and 53. The arms extend in the longitudinal direction of the holder and over half the length or radius R of the ball. The arm retain the ball via end parts, for example 50a, by means of the inherent resilience of the material of the arms. The ball cooperates with the seat via its free sphere-shaped part 49a. The holder also has a peg 48a designed to extend inside the relevant spring/spring member, for example the spring 40 in FIG. 9d.

Figure 12:
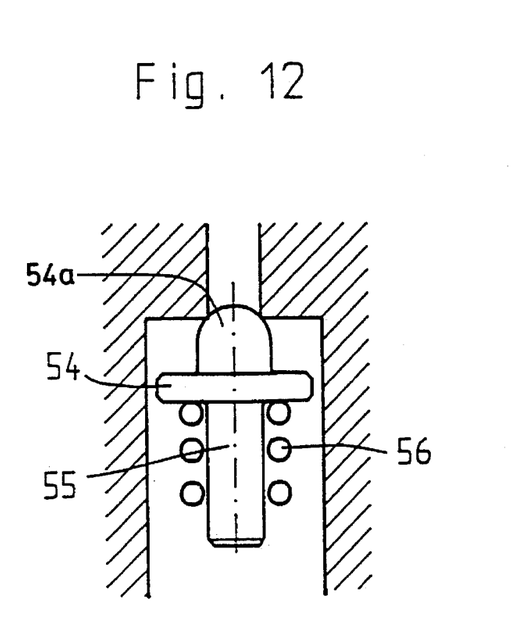
FIGS. 12–15 show, in a vertical view, an embodiment in which the shut-off element gas been built together with the force transmission member, and further embodiments, respectively.

In accordance with FIG. 12, the sphere-shaped part 54a can be constructed together with the force transmission part/pin 54 that bears a peg 55 extending inside the spring 56. The unit 53, 54 can, in accordance with the above, be made of steel, brass, plastic, and other materials.

The material in the force transmission member or the pin 12 according to the above can be made of free-cutting steel, brass, stainless steel, and other materials, according to the above.

Figure 13:
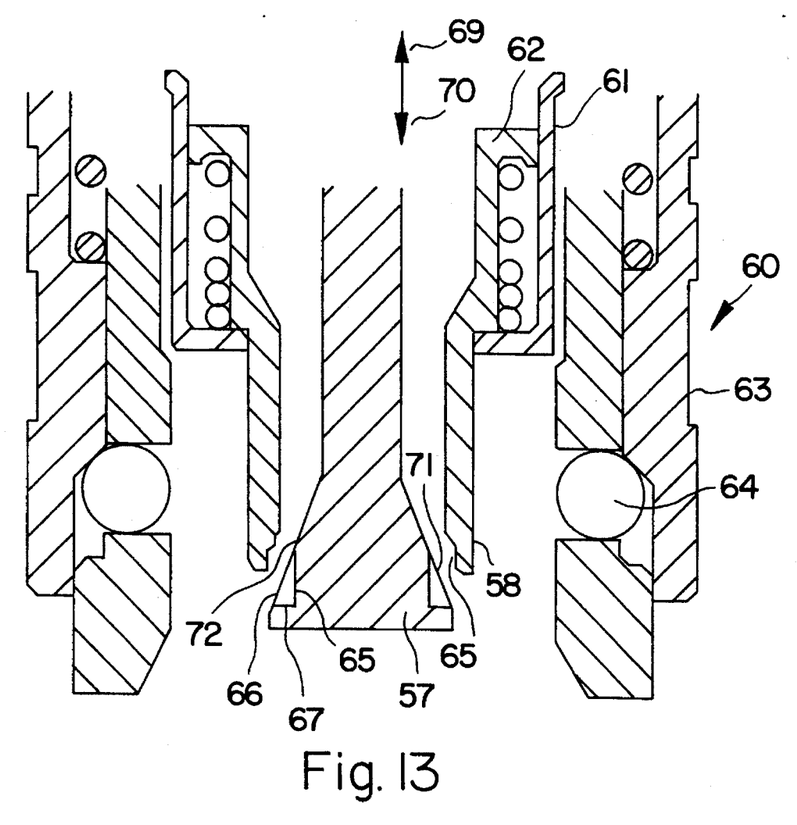
Figure 14:
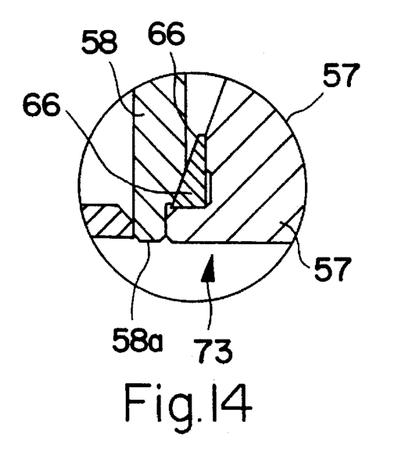
Figure 15:
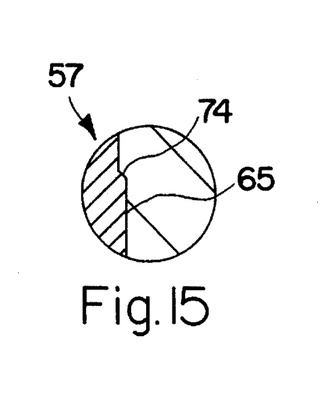

The invention is not limited to the embodiment shown hereinabove by way of example, but can instead be modified within the scope of the subsequent patent claims and the inventive concept. In the embodiment shown above, special consideration has been given to the path of the medium (in particular the main medium) through the coupling. The pressure reduction function does not interfere with the through-flow of the medium. In this way, pressure peaks in the medium are not eliminated in an inappropriate manner, but instead these can be measured, for example by connection to and measuring by computer equipment, which can be carried out in a manner known per se. FIG. 13 shows first and second coupling parts 57 and 58 positioned in a coupling part 60, for example, a female coupling part. However the principle is valid on male coupling parts as well. The coupling part 57 is a valve member that is movable or fixed in longitudinal direction. The second coupling part is an inner case member movable relatively to the first coupling part 57. The coupling part 60 includes a outer slidable casing 61 displaceable relative to casing 58 against the force of the spring member 62. The coupling part 60 also includes a slidable outer member 63 and locking ball 64, well known in the art. The second coupling part 58 is provided with a seat 65. The first coupling part 57 supports a seal in soft metal or alloys of metals, for example in aluminium or in alloys including aluminium, bronz, among others. The seal 66 is positioned on the part 57 in a recess including the substantially transverse surface 67 and the substantially axial surface 68. FIG. 13 discloses when the coupling part 60 is in co-operation with another coupling part, not shown in FIG. 13 in the sake of simplicity. Media is allowed to be transmitted in either of the directions 69, 70 through the coupling 60. In a disconnected position the first and second parts are pressed against each other, see FIG. 14. The media force F can be high (1000 bar or more). The part 58 is pressed against part 57 via the seat 65. The seal 66, positioned between parts 57 and 58 will be actuated by high pressure. In this actuation the soft metal or metal alloy seal will adapt to irregularities in parts 57 and 58 and a leakfree seal function is obtained between surfaces 67 and 68 of the first part 57 and the seal and between the seal and set 65 of the second part 58. In the shown section of FIGS. 13 and 14, the seal has substantially the form of a triangle. The outer surface 71 of the seal substantially follows the outer surface 72 of the part 57. The coupling is a flat nos coupling with the substantially even outer surface 73 in which the outer surface 58a of the member 58 constitutes a part. FIG. 15 shows the axial surface 68 that is provided with an irregularity. The irregularity could include, for example one or more barbs, one or more channels, one or more grooves, and/or one or more other irregularities. The irregularities interact with the material of the seal 66 in order to keep it in its position in spite of forces arising in the media, the seat, and other parts.

I claim:

1. A quick coupling component, comprising:
   at least one valve member for opening and closing a main flow;
   a pressure reduction channel provided in at least one valve member; and
   a pressure reduction member arranged in said pressure reduction channel, said pressure reduction member including:
   a shut-off element arranged in said pressure reduction channel, said shut-off element including a spherical surface and moving between an open position and a closed position;
   a seat arranged in said pressure reduction channel, said seat including a seat surface, wherein in said closed position a first portion of said shut-off element surface bears against said seat surface, thereby sealing said pressure reduction channel, said seat surface substantially corresponding to said shut-off element first surface portion, said seat surface including a degree of fineness substantially corresponding to a degree of fineness of said shut-off element, at least one of said seat and said shut-off element being formed of a material having a hardness substantially exceeded by a hardness of another of said seat and said shut-off element, at least one of said seat and shut-off element being formed of a material having an elasticity contributing to a function sealing of said shut-off element against said seat in said closed position;
   a force transmission member for maintaining said shut-off element in said closed position, said force transmission member including a surface designed to contact said shut-off element along a second portion of said surface of said shut-off element; and
   an activation member for separating said shut-off element from said seat surface into said open position counter to an action of said force transmission member.

2. A quick coupling component according to claim 1, wherein said shut-off element is formed of a material having a hardness substantially exceeding a hardness of a material said seat is formed of.

3. A quick coupling component according to claim 1, wherein said force transmission member includes an impression including a surface having a semi-spherical contour for contacting said shut-off element second surface portion.

4. A quick coupling component according to claim 1, wherein said hardness of said seat element material exceeds said hardness of said shut-off element material by from about one to about four times.

5. A quick coupling component according to claim 1, wherein said seat surface corresponds to said shut-off element surface portion due to persistent deformation of said seat material, and said elasticity of said seat material contributes to said sealing function during said persistent deformation.

6. A quick coupling component according to claim 1, wherein 50–100% of the degree of fineness of said shut-off element is transferred to said seat surface by a knocking force moving said shut-off element toward said seal, said knocking force causing a persistent deformation of said seat material.

7. A quick coupling component according to claim 1, wherein said knocking force is 0.3–1.0 newton/sec$^2$.

8. A quick coupling component according to claim 1, wherein said force transmission member is actuated by a spring, said contacting surface of said force transmission member includes a planar surface for cooperating with said portion of said shut-off element surface portion, said planar surface including an impression for receiving said shut-off element surface portion.

9. A quick coupling component according to claim 8, wherein said impression has a chord diameter of between ten and twenty-five percent of a diameter of said shut-off element.

10. A quick coupling component according to claim 1, wherein said shut-off element has a spherical shape and has a hardness of 40–65 HRC.

11. A quick coupling component according to claim 10, wherein said seat material includes at least one member selected from the group consisting of steel having a hardness of 150–170 HB, brass having a hardness of 100–200 Hv, and stainless steel having a hardness of approximately 100 EB.

12. A quick coupling component according to claim 10, wherein said shut-off element has a hardness of approximately 55 HRC.

13. A quick coupling component according to claim 1, wherein said quick coupling component comprises a hardened part and a non-hardened part, and wherein said seat is provided in said non-hardened part by removing a hardened layer of said non-hardened part.

14. A quick coupling component according to claim 1, wherein said pressure reduction channel has a diameter of 2–3 mm, and said shut-off element has a diameter approximately 50–85% of said pressure reduction channel diameter.

15. A quick coupling component according to claim 1, wherein said shut-off element has a diameter approximately 75% of said pressure reduction channel diameter.

16. A quick coupling component according to claim 1, wherein said seat surface has a degree of fineness of between $5\times10^{-9}$ mm and $20\times10^{-9}$ mm, and the elasticity in the seat material is approximately $10^{-7}$ mm.

17. A quick coupling component according to claim 1, wherein said shut-off element is a plastic ball of polyoxymethane.

18. A quick coupling component according to claim 1, wherein said seat is formed from said at least one valve member.

19. A quick coupling component according to claim 1, wherein said shut-off element material is substantially harder than said seat material, and said seat includes a bevelled surface, said seat surface being formed by an upsetting said seat material on said bevelled surface, said bevelled surface at least partially remaining after formation of said seat surface, said bevelled surface eliminating flash edges and burrs in said seat material.

20. A quick coupling component according to claim 1, further comprising:
    a holder for receiving said shut-off element, said holder being guided against an inner wall of said pressure reduction channel, said holder including a plurality of arms for engaging said surface of said shut-off member, said holder arms having a length greater than a radius of said shut-off element, said holder arms retaining said shut-off element by an inherent resilience in material forming said holder, said holder also including a bearing member for engaging a spring member;
    wherein a portion of said shut-off element surface not enclosed by said holder cooperates with said seat, and wherein a medium flows between said holder arms when said pressure reduction member is activated.

21. A quick coupling component according to claim 1, wherein in said open position said shut-off element is separated from said seat by said activation member by a distance less than a height of said shut-off element first surface portion, thereby helping to prevent said shut-off element from being laterally displaced and leaving said seat when said shut-off element is in said open position.

22. A quick coupling component according to claim 1, wherein said seat material is a material having hardness corresponding to a hardness of brass and a bottom of said seat is inclined in relation to a wall of said pressure reduction channel by 75°–95°.

23. A quick coupling component according to claim 1, wherein said pressure reduction channel includes a middle space, a first outer space, and a second outer space, said spaces having different cross-sectional areas;

said middle space has a cross-sectional area of a size between a size of said cross-sectional area of said first and second outer spaces;

said middle space accommodates said shut-off element, said force transmission member and a counter spring for urging said force transmission member against said shut-off element;

said first outer space and said middle space are connected by a transition forming said seat;

said second outer space and said middle space are connected by a second transition, wherein a retaining member is arranged in said second transition; and said activation member is arranged in the first outer space.

24. A quick coupling component according to claim 1, wherein said seat is arranged on a bushing-shaped part arranged in said pressure reduction channel.

25. A quick coupling component according to claim 1, wherein said seat is arranged on a ring-shaped part arranged in said pressure reduction channel.

26. A quick coupling component according to claim 1, further comprising:

a spring member for actuating said force transmission member;

a support member for supporting said spring member; and a hollow cylinder arranged in said pressure reduction channel, an end of said hollow channel including a through hole, said seat being arranged in said through hole;

wherein said seat, said shut-off element, said force transmission member, said spring member and said support member are arranged in said hollow cylinder.

* * * * *

UNITED STATES PATENT AND TRADEMARK OFFICE
CERTIFICATE OF CORRECTION

PATENT NO. : 5,467,964
DATED : November 21, 1995
INVENTOR(S) : Thure Ekman

It is certified that error appears in the above-identified patent and that said Letters Patent is hereby corrected as shown below:

Column 9
In claim 1, line 27, change "function sealing" to --sealing function--.

Signed and Sealed this

Twenty-second Day of October, 1996

Attest:

BRUCE LEHMAN

Attesting Officer          Commissioner of Patents and Trademarks